(12) United States Patent
Dragicevic et al.

(10) Patent No.: US 10,085,082 B2
(45) Date of Patent: Sep. 25, 2018

(54) EARPIECE WITH GPS RECEIVER

(71) Applicant: BRAGI GmbH, München (DE)

(72) Inventors: Darko Dragicevic, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/449,158

(22) Filed: Mar. 3, 2017

(65) Prior Publication Data
US 2017/0264990 A1    Sep. 14, 2017

Related U.S. Application Data

(60) Provisional application No. 62/307,088, filed on Mar. 11, 2016.

(51) Int. Cl.
| | |
|---|---|
| *H04R 1/10* | (2006.01) |
| *G01S 19/49* | (2010.01) |
| *G01S 19/14* | (2010.01) |
| *H04S 7/00* | (2006.01) |

(52) U.S. Cl.
CPC .......... *H04R 1/1041* (2013.01); *G01S 19/14* (2013.01); *G01S 19/49* (2013.01); *H04R 1/1016* (2013.01); *H04R 1/1025* (2013.01); *H04R 2420/07* (2013.01); *H04R 2420/09* (2013.01); *H04R 2460/07* (2013.01); *H04S 7/304* (2013.01)

(58) Field of Classification Search
CPC .. H04R 1/1041; H04R 1/1016; H04R 1/1091; H04R 1/1025; H04R 2420/07; H04R 2420/09; H04R 2460/07; G01S 19/49; G01S 19/14
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |

(Continued)

FOREIGN PATENT DOCUMENTS

| | | |
|---|---|---|
| CN | 104837094 A | 8/2015 |
| EP | 1017252 A2 | 7/2000 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Ping Lee
(74) *Attorney, Agent, or Firm* — Goodhue, Coleman & Owens, P.C.

(57) ABSTRACT

An earpiece includes an earpiece housing, a processor disposed within the earpiece, a speaker operatively connected to the processor, a microphone operatively connected the processor, and a global navigation satellite system (GNSS) receiver disposed within the earpiece. A system may includes a first earpiece having a connector with earpiece charging contacts, a charging case for the first earpiece, the charging case having contacts for connecting with the earpiece charging contacts, and a glob& navigation satellite system (GNSS) receiver disposed within the charging case.

7 Claims, 8 Drawing Sheets

(56) References Cited

U.S. PATENT DOCUMENTS

| | | |
|---|---|---|
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 8,994,498 B2 | 3/2015 | Agrafioti et al. |
| 9,081,944 B2 | 7/2015 | Camacho et al. |
| 9,510,159 B1 | 11/2016 | Cuddihy et al. |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0146890 A1 | 6/2008 | Leboeuf et al. |
| 2008/0254780 A1 | 10/2008 | Kuhl et al. |
| 2011/0140956 A1* | 6/2011 | Henry ................ G01S 19/34 342/357.3 |
| 2014/0010391 A1* | 1/2014 | Ek .................... G06F 3/011 381/310 |
| 2015/0028996 A1 | 1/2015 | Agrafioti et al. |
| 2016/0033280 A1 | 2/2016 | Moore et al. |

FOREIGN PATENT DOCUMENTS

| | | |
|---|---|---|
| GB | 2074817 | 4/1981 |
| JP | 06292195 | 10/1994 |
| WO | 2007034371 A3 | 11/2008 |
| WO | 2012071127 A1 | 5/2012 |
| WO | 2013134956 A1 | 9/2013 |
| WO | 2014043179 | 7/2014 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
BMW, "BMW introduces BMW Connected-The personalized digital assistant", "http://bmwblog.com/2016/01/05/bmw- introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI-Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).

(56) References Cited

OTHER PUBLICATIONS

BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jun. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy are We Getting Close(Sep. 10, 2015).
Hyundai Motor America, "Hyundai Motor Company Introduces a Health + Mobility Concept for Wellness in Mobility", Fountain Valley, Californa (2017).
Last Push Before The Kickstarter Campaign Ends on Monday 4pm CET (Mar. 28, 2014).
Nigel Whitfield: "Fake tape detectors, 'from the stands' footle and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

EARPIECE WITH GPS RECEIVER

PRIORITY STATEMENT

This application claims priority to U.S. Provisional Patent Application 62/307,088, filed on Mar. 11, 2016, and entitled Earpiece with GPS receiver, hereby incorporated by reference in its entirety.

FIELD OF THE INVENTION

The present invention relates to wearable devices. More particularly, but not exclusively, the present invention relates to ear pieces.

BACKGROUND

Earpieces have conventionally had extremely limited functionality and use. However, there are numerous problems in extending that use including the lack of space and power considerations. What is needed is an improved earpiece and the ability to track or determine location of a user using an earpiece.

SUMMARY

Therefore, it is a primary object, feature, or advantage of the present invention to improve, over the state of the art.

It is a further object, feature, or advantage of the present invention to provide apparatus, methods and systems which allow earpieces to determine location of a user.

It is a still further object, feature, or advantage of the present invention use of available Global Navigation Satellite Systems to determine location.

Another object, feature, or advantage is to determine location of an earpiece in a manner that limits power consumption.

Yet another object, feature, or advantage is to determine location of an earpiece that allows for thermal management.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, an earpiece is provided. The earpiece includes an earpiece housing, a processor disposed within the earpiece, a speaker operatively connected to the processor, a microphone operatively connected the processor, and a global navigation satellite system (GNSS) receiver disposed within the earpiece. There may also be one or more inertial sensors disposed within the earpiece housing and operatively connected to the processor. The at least one inertial sensor may include an accelerometer. The processor may be adapted to determine when the GNSS receiver is not providing current location data and updating a current location of the earpiece based on a last available location from the GNSS receiver and data from the at least one inertial sensor. The earpiece may include a wireless transceiver to communicate a geospatial location determined by the GNSS receiver to another earpiece. The processor may be configured to turn the GNSS receiver off such as in, the course of managing battery life or temperature conditions. The GNSS receiver may be a global positioning system (GPS) receiver.

According to another aspect, a method of maintaining a current location of an earpiece is provided. The method includes determining a geospatial location using a global navigation satellite system (GNSS) receiver disposed within the earpiece, updating a current location of the earpiece with the geospatial location, and updating the current location of the earpiece with data from one or more inertial sensors disposed within the earpiece. The step of updating the current location of the earpiece with data from the one or more inertial sensors disposed within the earpiece may be performed if the GNSS receiver is unable to determine a geospatial location such as when a satellite lock is not available or if the GNSS receiver is turned off such as to manage battery life or temperature.

According to another aspect, a system includes a first earpiece having a connector with earpiece charging contacts, a charging case for the first earpiece, the charging case having contacts for connecting with the earpiece charging contacts, and a global navigation satellite system (GNSS) receiver disposed within the charging case. The system may further include a processor disposed within the earpiece and: or an inertial sensor disposed within the earpiece. The system may be configured to convey a geospatial location from the charging case to the processor of the first earpiece. The geospatial location may be conveyed wirelessly from the charging case to the first earpiece. The geospatial location may be conveyed through the connector of the first earpiece. The system may be configured to set a current location using the geospatial location and then update the current location using data from the inertial sensor. The first earpiece may include an ear piece housing, a processor disposed within the earpiece housing, a microphone operatively connected to the processor, and a speaker operatively connected to the processor. The GNSS receiver may be a global positioning system (GPS) receiver.

According to another aspect, a method of maintaining a current location of an earpiece is provided. The method includes determining a geospatial location using a global navigation satellite system (GNSS) receiver disposed within an earpiece charging case, conveying the geospatial location from the earpiece charging case to an earpiece configured to fit within the earpiece charging case for charging, and updating a current location of the earpiece with the geospatial location. The method may further include updating the current location of the earpiece based on movement of the earpiece determined from one or more inertial sensors.

DETAILED DESCRIPTION

Figure 1:
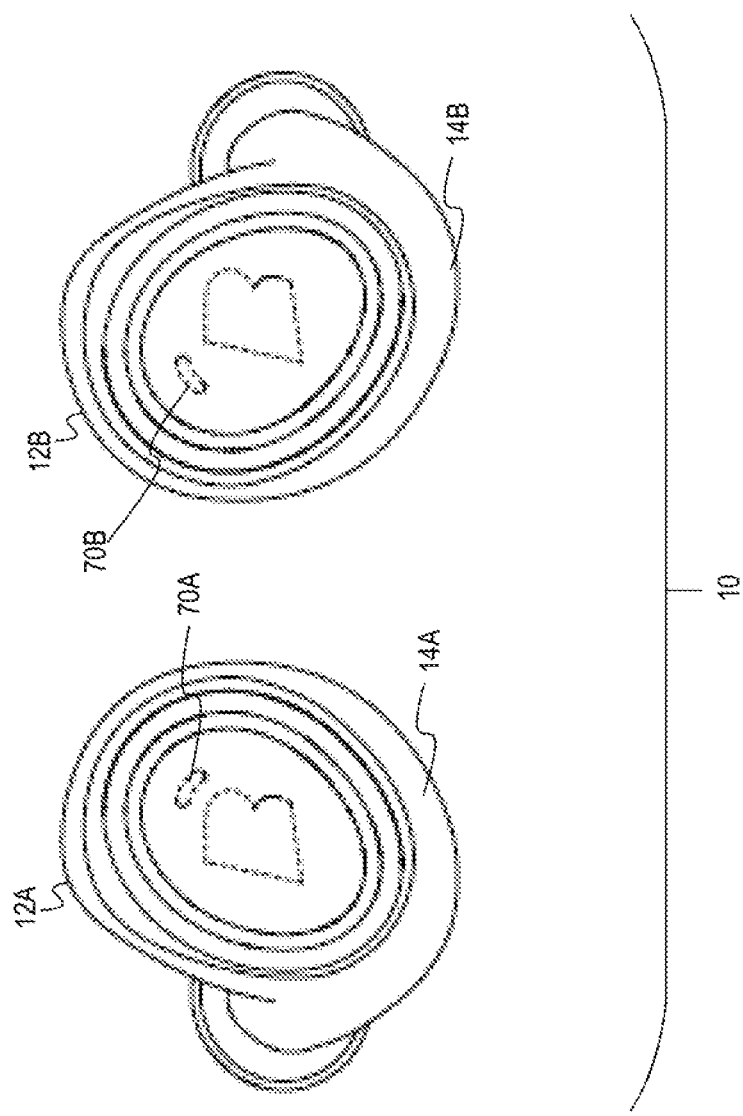
FIG. 1 illustrates a left earpiece and a right earpiece.

FIG. 1 illustrates a set of earpieces 10 including a left earpiece 12A and a right earpiece 12B. The left earpiece 12A has a housing or casing 14A and the right earpiece 12B has a housing or casing 14B. A microphone 70A is shown on the left earpiece 12A and a microphone 70B is shown on the right earpiece 12B.

Figure 2:
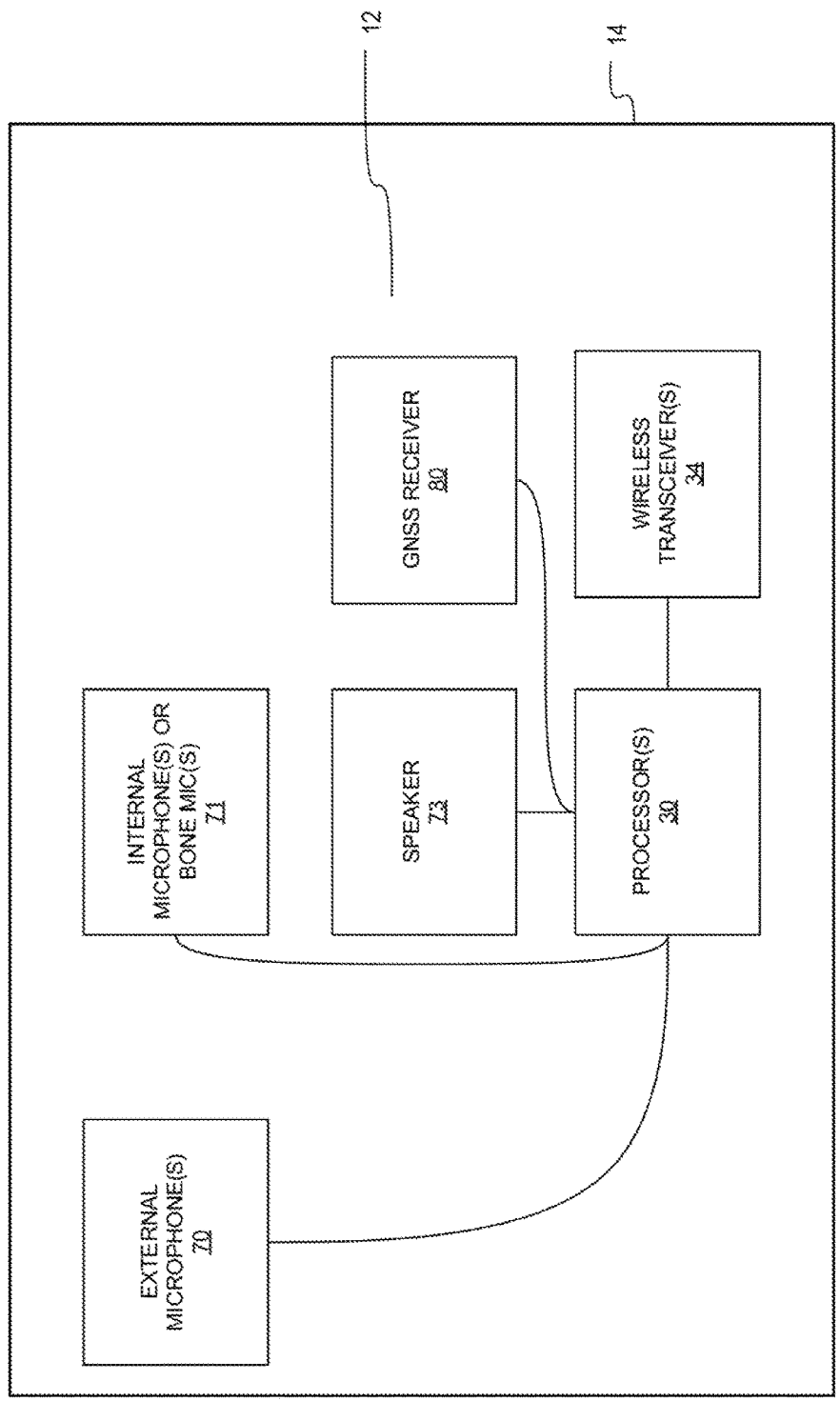
FIG. 2 is block diagram illustrating an earpiece with a GNSS receiver.

FIG. 2 illustrates an earpiece 12 which may be a left earpiece or a right earpiece. One or more processors or other intelligent controls 30 are shown disposed within the housing 14 of the earpiece. One or more wireless transceivers 34 are operatively connected to the processors 30. The wireless transceivers 34 may include a BLUETOOTH transceiver, an ultra-wideband (MB) transceiver, or type of radio transceiver, a near field magnetic induction (NFMI) transceiver, or other type of transceiver. One or more external microphones 70 is operatively connected to the processors 30 as are one or more internal microphones or bone microphones 71. A global navigation satellite system (GNSS) receiver is also disposed within the housing 14 of the earpiece 12. The GNSS receiver may be a Global Positioning System (GPS) receiver a Globalnaya Navigazionnaya Sputnikovaya Sistema (GLOSNASS) receiver or other type of GNSS receiver.

Figure 3:
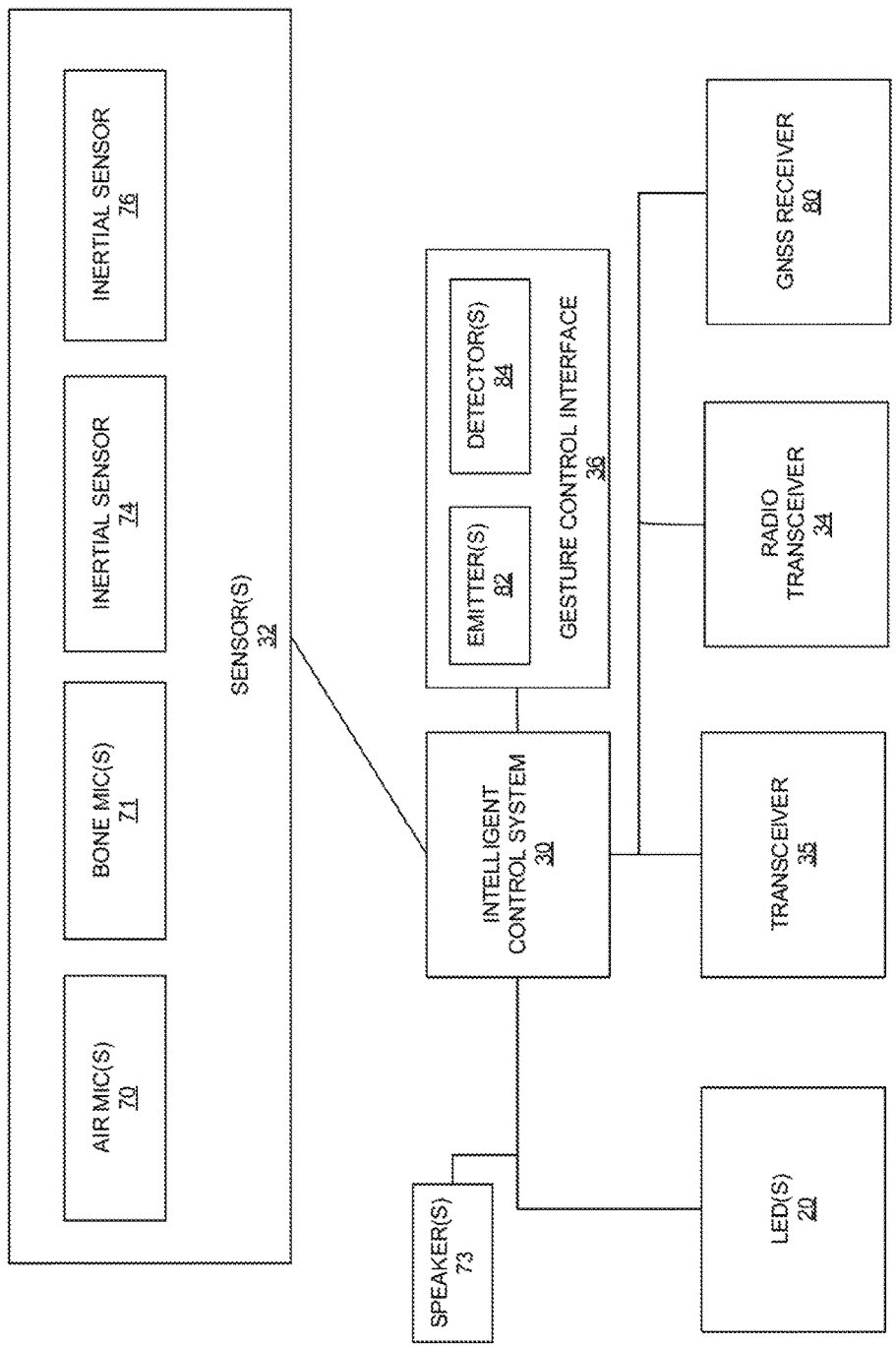
FIG. 3 is another block diagram illustrating an earpiece with a GNSS receiver.

FIG. 3 is a block diagram illustrating an earpiece. The earpiece may include one or more sensors 32. The sensors may include one or more air microphones 70, one or more bone microphones 71, and one or more inertial sensors 74, 76. Each of the one or more sensors 32 is operatively connected to an intelligent control system 30. The intelligent control system 30 may also be operatively connected to a gesture control interface 36 which may include one or more emitters 82 and one or more detectors 84. The gesture control interface 36 allows a user to interact with the earpiece through gestures or motions which are detected by the gesture control interface and interpreted by the intelligent control system 30. One or more speakers 72 is operatively connected to the intelligent control system 30. One or more light emitting diodes 20 are operatively connected to the intelligent control system 30 that may be used to provide visual feedback indicative of earpiece functionality or status. A radio transceiver 34 is shown as well as a second transceiver 35 which may be an NFMI transceiver or other type of transceiver.

Figure 4:
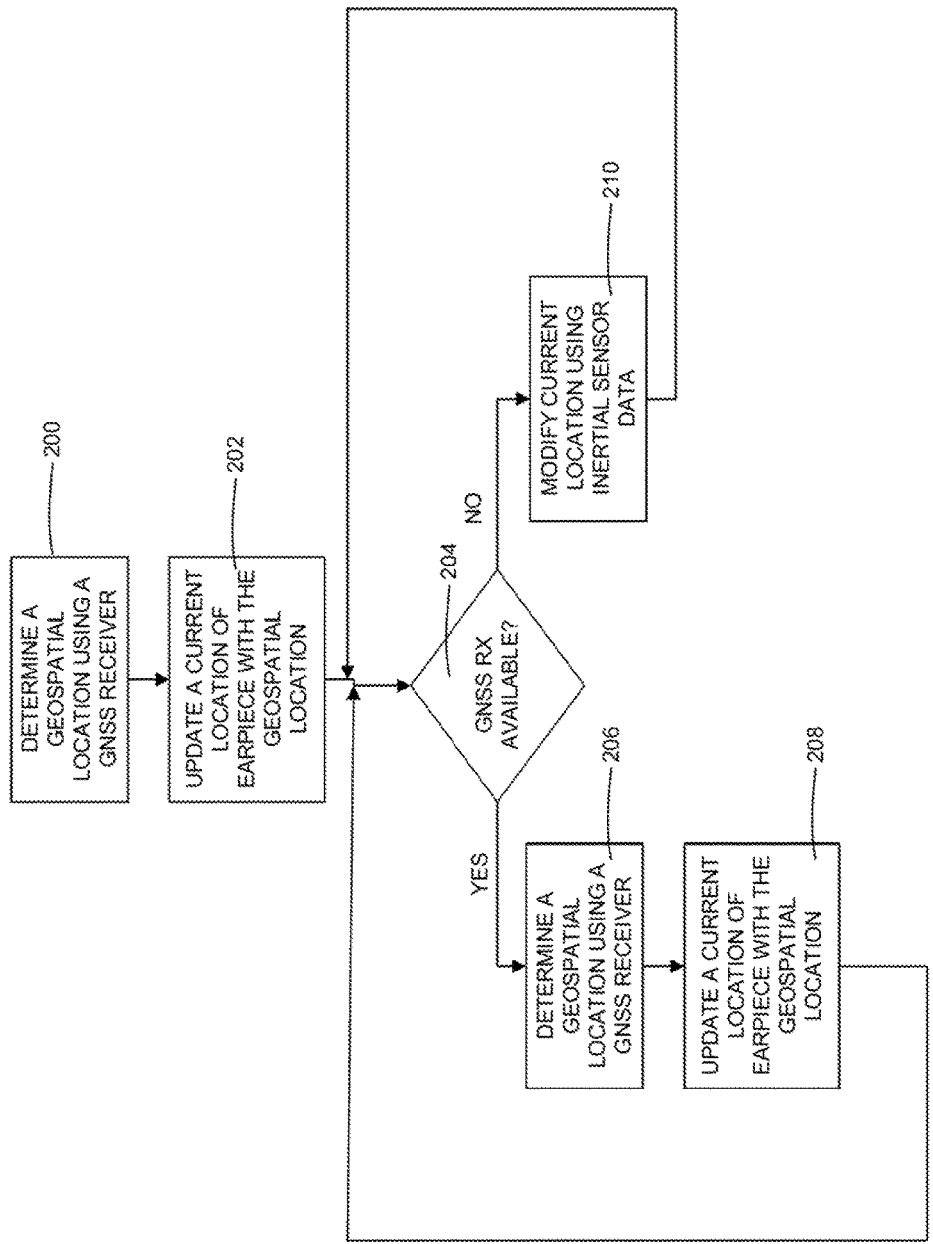
FIG. 4 is a flow chart illustrating one method of determining location of an earpiece.

FIG. 4 illustrates one example of a methodology. In step 200 a determination is made regarding a geospatial location using a GNSS receiver. A geolocation or position is determined in step 200 and in step 202 a current location of the earpiece may be updated with the geospatial location. In step 204 a determination is made as to whether the GNSS receiver is still available. It is contemplated that information from the GNSS receiver may not always be available for a number of reasons. First, in order to extend battery life of the earpiece or to otherwise better manage battery life the earpiece may turn off the GNSS receiver of the earpiece. Thus, when turned off the GNSS is not considered available. There are other instances where the GNSS receiver may also be turned off. For example, if the temperature associated with the earpiece exceeds a threshold the GNSS receiver may be turned off as a part of thermal management is procedures. Regardless of whether the GNSS receiver is off or on it may not always be available to provide position information. For example, if the earpiece is indoors, underground, in an area where there is interference, the signal is being jammed, the GNSS receiver is unable to get a satellite lock and unable to provide position data. In these instances, when the GNSS is not available (for whatever reason(s)), position may be still be determined or tracked. This is performed by using information from one or more inertial sensors providing inertial sensor data. The inertial sensor data may be used to sense or infer movement. The earpiece ma calculate a current location based on changes in position determined from the inertial data. Thus position may be determined even though a geolocation is not available directly from the GNSS receiver.

Below is one example of pseudo-code which may be used to determine a current location using a GNSS receiver if available and calculate a current location from a last known location and inertial data.

```
If GNSS_receiver_available:
    current_loc = Get_geoloc( )
            current_loc_time = Get_time( )
else:
    current_loc = calculate_loc (current_loc,
current_loc_time)
        current_loc_time = Get_time( )
```

It is contemplated, however, that this methodology may be implemented in any number of ways in order to reduce the processing resources used. For example, position may only be updated when the amount of change in position as determined by the inertial sensor exceeds a particular threshold. Similarly, if the inertial sensors determine that there is very little change in position then the earpiece may turn off or power down, or change modes of power consumption for the GNSS receiver in order to conserve resources. For example the pseudo-code below illustrates one way of powering down the GNSS if the earpiece is not moving or has entered a power saving mode.

```
If not_moving or power_save_Mode:
    PowerdownGNSS( )
    GNSS_receiver_available = 0
```

It is contemplated, however, that the methodology may be implemented in any number of ways in addition to that which is shown and described herein.

Figure 5:
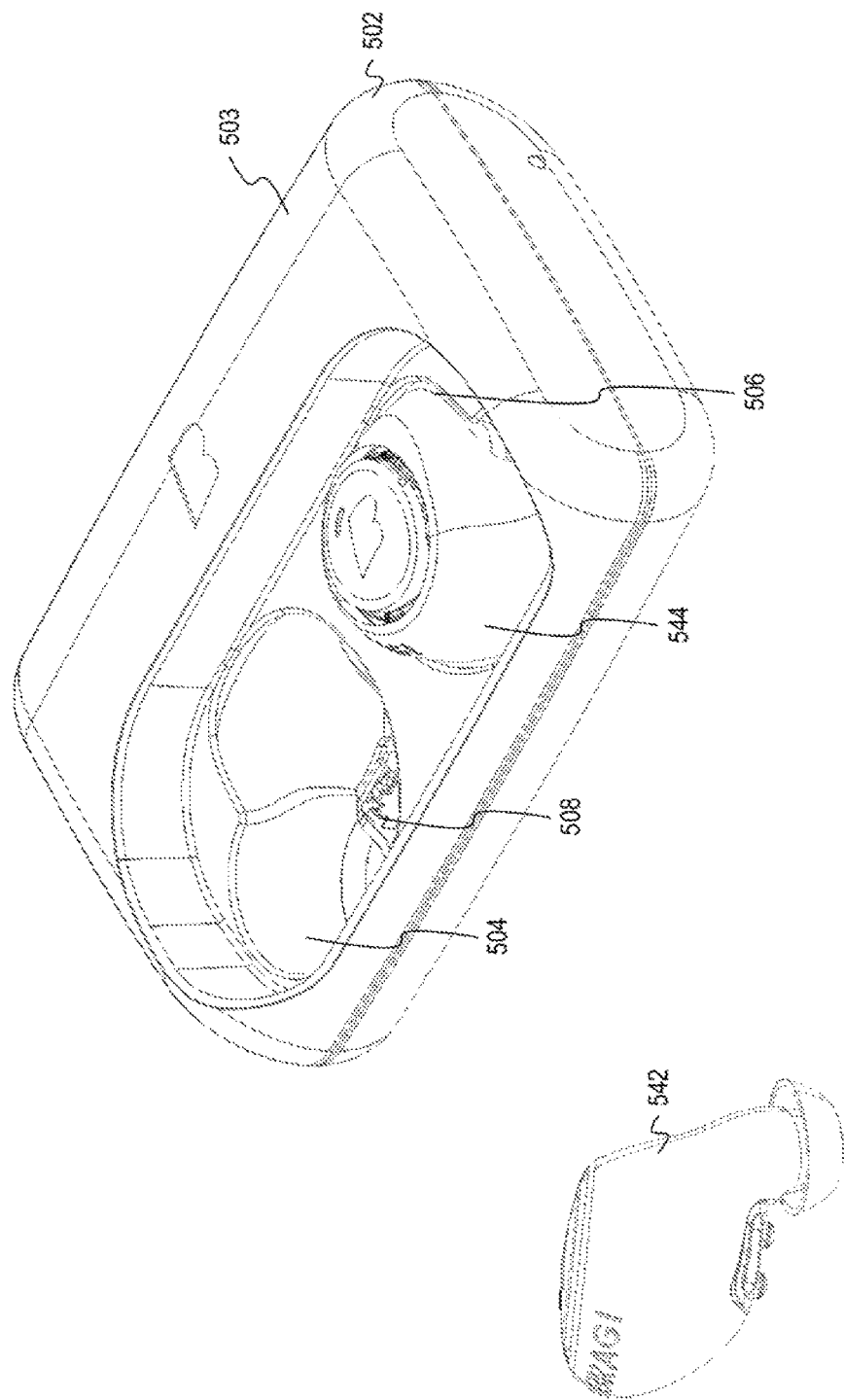
FIG. 5 illustrates a pair of earpieces and a charging ease.
Figure 6:
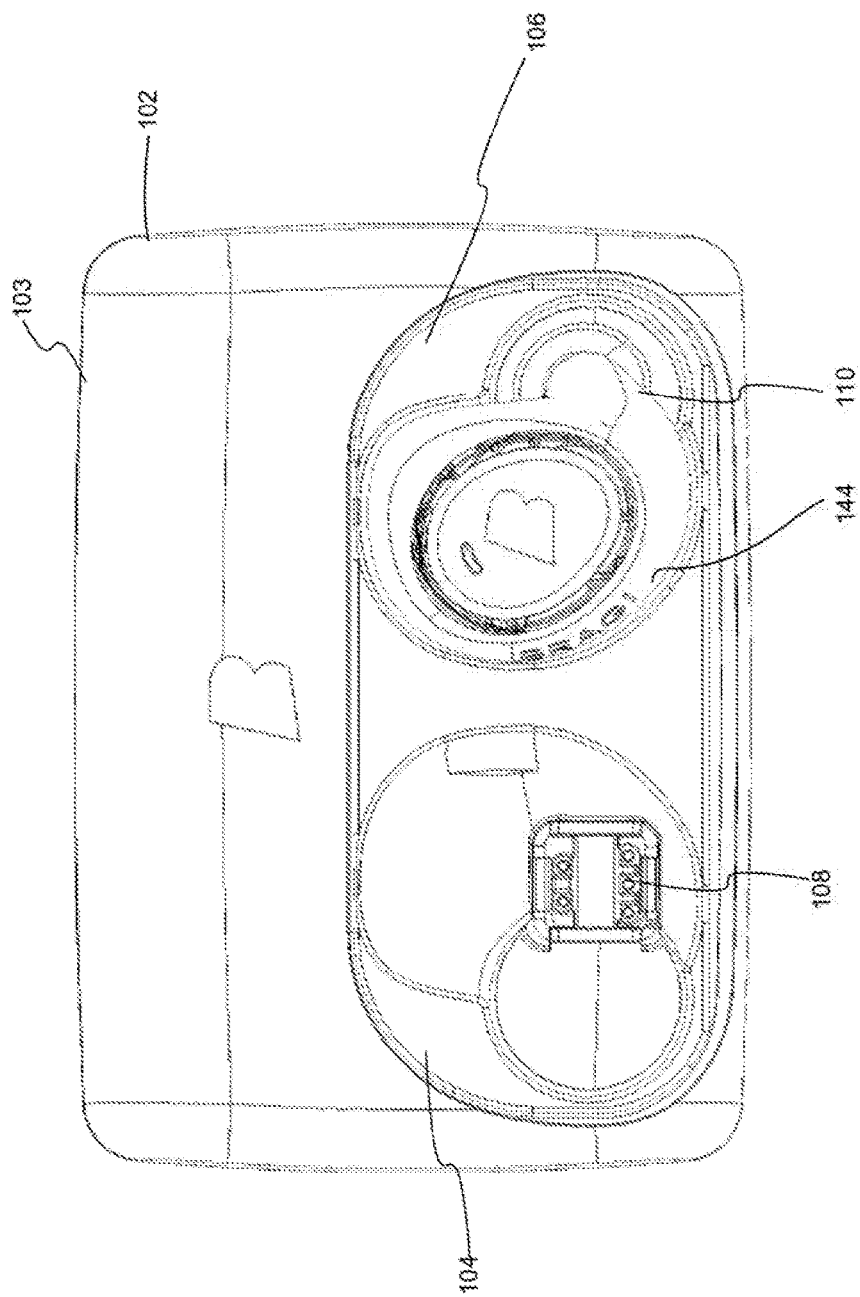
FIG. 6 illustrates another view of a charging case.

Instead of or in addition to having a GNSS receiver in one or more earpieces, the one, or more earpieces may have a charging case associated with them. FIG. 5 illustrates one example of a charging case 502 with a case housing 503. A first earpiece area 504 and a second earpiece area 506 are shown for receiving earpieces 12A, 12B, respectively. The earpieces 12A, 12B are matingly connected or otherwise come in contact with contacts 508, 506. Thus, for example the contacts 510 of earpiece 12A come into contact with the contacts 508 of the charging case 502. When earpieces 12A, 12B are received in the earpiece areas 504, 506, the connections are made to allow for charging of the earpieces 12A, 12B as well as data communication directly from the charging case 502 the earpieces 12A, 12B. FIG. 6 illustrates another view of the charging case 502 to show the contacts 508 of the charging case 502 at a different angle. The contacts may take on multiple forms shapes, sizes, connectors, or materials.

Figure 7:
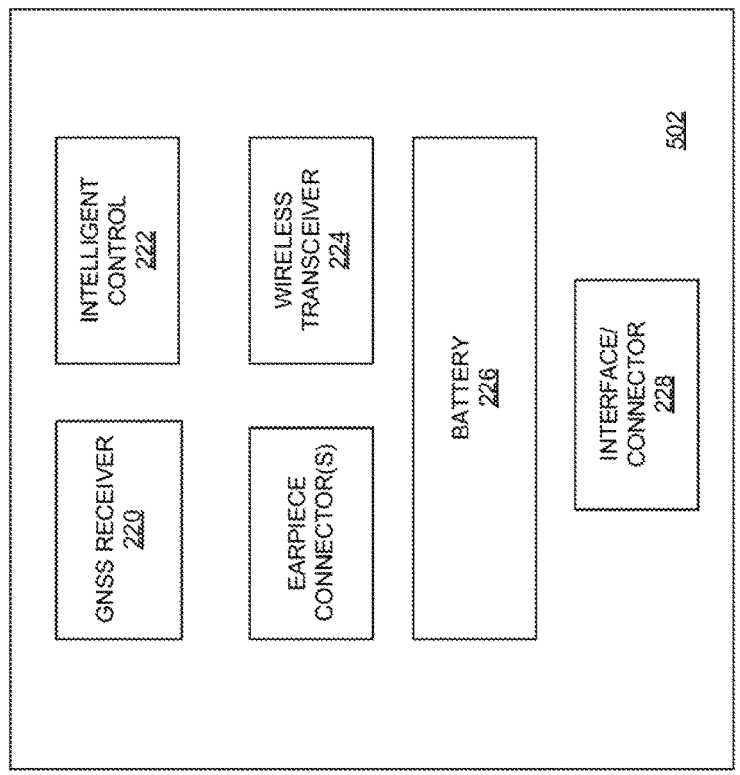
FIG. 7 is a block diagram illustrating a charging case.

FIG. 7 illustrates a block diagram of one embodiment of a charging case 502. The charging case 502 may include a GNSS receiver 220, an intelligent control 222 operatively connected to the GNSS receiver 220, one or more earpiece connectors 508 for coming, in contact with the earpiece and operatively connected to the intelligent control 222, a wireless transceiver 224 operatively to the intelligent control 222, a battery 226 disposed within the housing of the charger 502 and an interface/connector 228 which may be a USB type interface to allow the charger 502 to be charged. The wireless transceiver 224 may receive position information determined by the GNSS receiver 220 and wirelessly communicate the position information to one or more earpieces when the one or more earpieces are not connected. The GNSS receiver 220 may also communicate position information to one or more earpieces when the earpieces are connected to the charging case.

It is contemplated that in many applications the earpieces are not located far from the charging case such as when a person is using the earpieces at home, at work, at the gym, or while travelling. In addition, the charging case may be plugged-in and charged more regularly and the battery 226 may have greater capacity than any batteries in the earpieces. Thus, it may be advantageous in certain implementations to place the GNSS receiver 220 in the charging case 502. Thus, the earpieces still have access to GNSS position data and can use that data as an approximate position of the earpieces or calculate position based on a combination of last GNSS position and movement of the earpieces as determined by inertial sensors of the earpieces as previously discussed.

Figure 8:
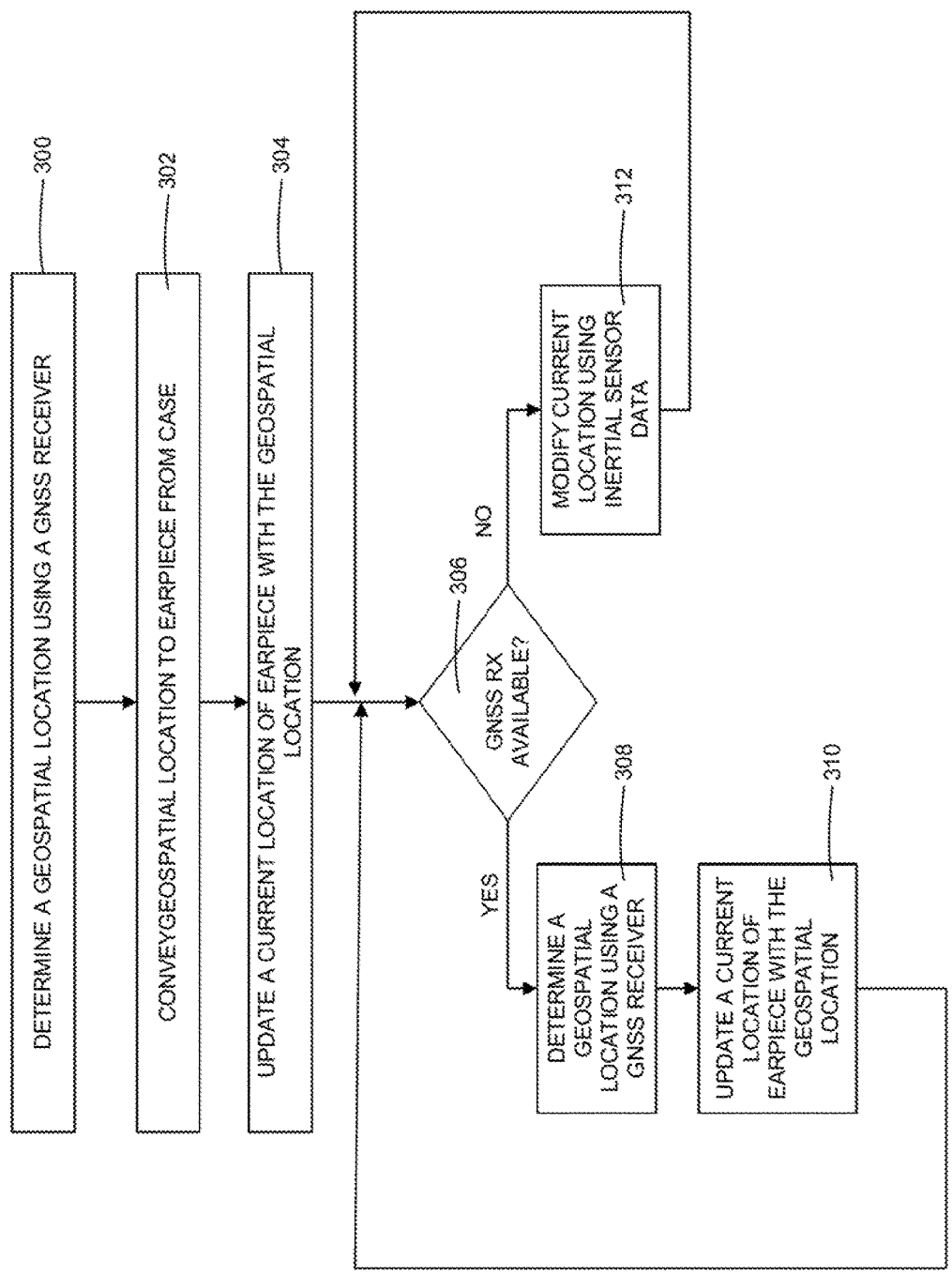
FIG. 8 is a flow chart illustrating another method of determining; location of an earpiece.

FIG. 8 illustrates one example of a method. In step 300 a geospatial location is determined using a GNSS receiver. In step 302 the geospatial location is conveyed from the case to the earpiece. This can be through an electrical connection such as when the earpiece is present within the case or can through wireless communication. Alternatively, the geospatial location may be conveyed wirelessly. Next in step 304, the current location of the earpiece may updated with the geospatial location. Then in step 306 a determination is made as to whether the GNSS receiver is available. This means that there is a connection with the case (either wired or wireless) and that the GNSS receiver is receiving location information. If it is not, then in step 312 the current location of the earpieces may be modified using inertial sensor data from one or more sensors of the earpiece. If it is, then in step 308 a geospatial location may be determined using the GNSS receiver and the current location of the earpiece may be updated with the geospatial location.

Thus, an earpiece with a GNSS receiver or which uses a GNSS receiver in its case has been shown and described. The present invention contemplates numerous variations, options, and alternatives including the location of the GNSS receiver, the type of GNSS receiver, the specific algorithms used, the type of materials, and tools used to implement the invention, the number and type of sensors present, the number and type of transceivers present, and any number of other variations.

What is claimed is:

1. An earpiece comprising:
    an earpiece housing configured to fit into an ear of a user;
    a processor disposed within the earpiece housing;
    a speaker operatively connected to the processor;
    a microphone operatively connected the processor;
    a global navigation satellite system (GNSS) receiver disposed within the earpiece;
    at least one inertial sensor disposed within the earpiece housing and operatively connected to the processor, wherein the at least one inertial sensor comprises an accelerometer;
    wherein the processor is adapted to determine when the GNSS receiver is not providing current location data and updating a current location of the earpiece based on a last available location from the GNSS receiver and data from the at least one inertial sensor; and
    wherein the processor is configured to turn the GNSS receiver off if a temperature associated with the earpiece exceeds a threshold.

2. The earpiece of claim 1 wherein the earpiece comprises a wireless transceiver to communicate a geospatial location determined by the GNSS receiver to another earpiece.

3. The earpiece of claim 1 wherein the GNSS receiver is a global positioning system (GPS) receiver.

4. The earpiece of claim 1 wherein the processor is adapted to determine that the earpiece is not moving based on inertial data from the at least one inertial sensor and if the earpiece is not moving turn the GNSS receiver off.

5. A method of maintaining a current location of an earpiece, the method comprising steps of:
    determining a geospatial location using a global navigation satellite system (GNSS) receiver disposed within the earpiece;
    updating a current location of the earpiece with the geospatial location;
    updating the current location of the earpiece with data from one or more inertial sensors disposed within the earpiece;
    monitoring a temperature associated with the earpiece and if the temperature associated with the earpiece exceeds a threshold, turning the GNSS receiver off;
    wherein the step of updating the current location of the earpiece with data from the one or more inertial sensors disposed within the earpiece is performed if the GNSS receiver is unable to determine a geospatial location; and
    wherein the step of updating the current location of the earpiece with data from the one or more inertial sensors disposed within the earpiece is performed if the GNSS receiver is turned off.

6. The method of claim 5 wherein the earpiece comprising an earpiece housing configured to fit into an ear of the user.

7. The method of claim 5 further comprising if the data form the one or more inertial sensors disposed within the earpiece is indicative that the earpiece is not moving then turning the GNSS transceiver off.

* * * * *

UNITED STATES PATENT AND TRADEMARK OFFICE
CERTIFICATE OF CORRECTION

PATENT NO. : 10,085,082 B2
APPLICATION NO. : 15/449158
DATED : September 25, 2018
INVENTOR(S) : Darko Dragicevic and Peter Vincent Boesen Page 1 of 1

It is certified that error appears in the above-identified patent and that said Letters Patent is hereby corrected as shown below:

On the Title Page

Abstract, Line 9, change "glob&" to --global--

Signed and Sealed this
Thirteenth Day of November, 2018

Andrei Iancu
*Director of the United States Patent and Trademark Office*